United States Patent [19]

Miyago et al.

[11] Patent Number: 5,781,372
[45] Date of Patent: Jul. 14, 1998

[54] AXIAL RESONANCE ATTENUATING APPARATUS FOR ROTATION DRUM APPARATUS HAVING FLEXIBLE ROD-SHAPED LINKING MEMBERS

[75] Inventors: Toshiharu Miyago; Yumi Matsui; Yoshikazu Nishida, all of Tokyo, Japan

[73] Assignee: Mitsubishi Denki Kabushiki Kaisha, Tokyo, Japan

[21] Appl. No.: 641,174

[22] Filed: Apr. 30, 1996

[30] Foreign Application Priority Data

May 16, 1995 [JP] Japan .................. 7-117075

[51] Int. Cl.⁶ .................. G11B 5/53; G11B 5/027
[52] U.S. Cl. .................. 360/107; 360/84
[58] Field of Search .................. 360/84–85, 98.07, 360/99.04, 99.08, 107, 109; 369/247, 263; 310/51, 81

[56] References Cited

U.S. PATENT DOCUMENTS

| 4,044,628 | 8/1977 | Jacks ............... 74/574 |
|---|---|---|
| 4,160,390 | 7/1979 | Spaetgens ............... 74/574 |
| 5,051,852 | 9/1991 | Kohno et al. ............... 360/84 |
| 5,138,902 | 8/1992 | Miller et al. ............... 74/574 |

FOREIGN PATENT DOCUMENTS

| 6-209538 A | 7/1994 | Japan . |
|---|---|---|
| 485140 | 5/1938 | United Kingdom . |
| 1239450 | 7/1971 | United Kingdom . |
| 1286019 | 8/1972 | United Kingdom . |

*Primary Examiner*—Stuart S. Levy
*Assistant Examiner*—George J. Letscher

[57] ABSTRACT

An axial resonance attenuating apparatus is formed by a disk-shaped attaching member, which is attached to a rotation shaft of a rotation drum apparatus or one of mass objects which are fixed to the both ends of the rotation shaft. A ring-shaped weight is disposed outside the attaching member, and a linking member which is formed by a plurality of straight and flexible support rods partially links the weight and the attaching member. The respective members are formed as one unit by an acrylonitrile-butadiene-styrene copolymer (ABS resin).

4 Claims, 12 Drawing Sheets

AXIAL RESONANCE ATTENUATING APPARATUS FOR ROTATION DRUM APPARATUS HAVING FLEXIBLE ROD-SHAPED LINKING MEMBERS

BACKGROUND OF THE INVENTION

1. Field of the Invention

The present invention relates to an axial resonance attenuating apparatus for suppressing axial resonance which is generated by rotation of a rotation shaft, for use within a rotation drum apparatus of a magnetic recording and reproducing apparatus in which mass objects are fixed to the both ends of the rotation shaft.

2. Description of Background Art

FIGS. 7A and 7B are a partially notched side view and a bottom view, respectively, of a rotation drum apparatus 50 and a surrounding portion of a magnetic recording and reproducing apparatus for a helical scanning system. The rotation drum apparatus 50 of the magnetic recording and reproducing apparatus comprises an upper drum 51 to which a magnetic head 51a is attached, and a lower drum 52 which includes a leading groove 52a for a magnetic tape. The magnetic tape is wound around the upper drum 51 and the lower drum 52. The rotation drum apparatus 50 further comprises a drum motor 53 for rotating the upper drum 51, and a rotary transmitter 55 for transmitting a signal read by the magnetic head 51a from the magnetic tape, toward a fixed circuit. A fixing member 53a of the drum motor 53 is fixed to the lower drum 52.

The upper drum 51 is fixed to one end of a drive shaft 53c which is attached to the center of rotation of a rotor 53b of the drum motor 53. The drive shaft 53c is supported for free rotation by the lower drum 52, through a bearing 54.

An axial resonance attenuating apparatus 60, which suppresses axial resonance which is generated in the drive shaft 53c when the drive shaft 53c rotates, is attached to the rotor 53b of the drum motor 53.

FIGS. 8A and 8B are a plan view and a cross sectional view, respectively, showing the structure of the axial resonance attenuating apparatus 60. FIG. 9 is a perspective view showing the structure of the axial resonance attenuating apparatus 60. The axial resonance attenuating apparatus 60 is formed by a disk-shaped attaching member 61 which is fastened to the rotor 53b of the drum motor 53 by a screw, a ring-like metallic weight 62, a rubber ring 63 which serves as a linking member for linking the metallic weight 62 to the attaching member 61. The rubber ring 63 also functions to attenuate axial resonance. The attaching member 61 and the metallic weight 62 are adhered to each other by an adhesive agent to sandwich the rubber ring 63. The attaching member 61 includes a hole 61a through which a lower portion of the drive shaft 53c penetrates, a screw hole 61b, and a positioning hole 61c for receiving a projection which is formed in the rotor 53b.

FIG. 10A is a schematic view showing the structure of the rotation drum apparatus 50 as it is without the axial resonance attenuating apparatus 60 attached. In FIG. 10A, the upper drum 51 which serves as a mass object is fixed to one end of the drive shaft 53c which is rotated by the drum motor 53, and so is the rotor 53b to the other end of the drive shaft 53c. Hence, rotation of the drive shaft 53c allows the two mass objects to create axial torsion. FIG. 10B is a graph of a frequency characteristic expressing resonance which is attributed to such axial torsion due to the two mass objects.

FIG. 11 shows actually measured data on a resonance frequency of the rotation drum apparatus 50 without the axial resonance attenuating apparatus 60 attached thereto. From FIG. 11, it is understood that the rotation drum apparatus 50 is at a resonance level of +6.27 dBV, with a resonance frequency of 925 Hz.

FIG. 12A is a schematic view showing the structure of the rotation drum apparatus 50 as it is with the axial resonance attenuating apparatus 60 attached. The rubber ring 63 links the attaching member 61 which is attached to the rotor 53b to the metallic weight 62. The rubber ring 63 can be expressed by a resistance 63a and an attenuation term 63b.

When the drive shaft 53c rotates, the shaft is twisted by three mass objects, namely, the upper drum 51, the rotor 53b and the metallic weight 62. FIG. 12B is a graph of a frequency characteristic expressing resonance which is created by such axial torsion due to these three mass objects. A frequency characteristic of such resonance includes two peaks, in general.

In a case where all three mass objects are linked by a rigid body such as the shaft, as denoted by a dashed line in FIG. 12B, resonance levels at the two peaks are the same as a resonance level which is created in the rotation drum apparatus 50 to which the axial resonance attenuating apparatus 60 is not attached (See FIG. 10B).

However, when one mass object (metallic weight 62) is linked by a member having the resistance 63a and the attenuation term 63b, such as the rubber ring 63, as in the axial resonance attenuating apparatus 60, the resonance levels at the two peaks decrease as denoted by a solid line in FIG. 12B. That is, an effect of the axial resonance attenuating apparatus 60 is a decrease in the resonance levels at the two peaks.

FIG. 12C is a graph of a frequency characteristic in a case where the resonance frequency of the axial resonance attenuating apparatus 60 is different from that of the rotation drum apparatus 50. As denoted by a solid line in FIG. 12C when the resonance frequency of the axial resonance attenuating apparatus 60 is shifted toward a high frequency side as compared with the resonance frequency of the rotation drum apparatus 50, and also as denoted by a dashed line in FIG. 12C when the resonance frequency of the axial resonance attenuating apparatus 60 is shifted toward a low frequency side as compared with the resonance frequency of the rotation drum apparatus 50, one of the two peak levels increases, which in turn reduces the effect of attenuating axial resonance.

FIG. 13 shows actually measured data on a resonance frequency of the rotation drum apparatus 50 with the axial resonance attenuating apparatus 60 attached thereto. As can be understood from the actually measured data, the rotation drum apparatus 50 with the axial resonance attenuating apparatus 60 attached thereto is at a resonance level of –4.98 dBV with a resonance frequency of 865 Hz, which means that there is an effect of attenuating axial resonance by 11.25 dBV as compared with the rotation drum apparatus 50 without the axial resonance attenuating apparatus 60 attached thereto. However, as can be understood from a fact that there is only one resonance peak, the resonance frequency of the axial resonance attenuating apparatus 60 is a little shifted from the resonance frequency of the rotation drum apparatus 50, so that the axial resonance attenuating apparatus 60 cannot sufficiently exhibit the effect of attenuating axial resonance.

Hence, to further suppress resonance of a rotation member such as the rotation drum apparatus 50, it is necessary to match the resonance frequency of the axial resonance attenuating apparatus to the resonance frequency of the rotation member.

As described above, the resonance frequency of the axial resonance attenuating apparatus needs be matched to the resonance frequency of the rotation member so that the axial resonance attenuating apparatus which is attached to the rotation member such as the rotation drum apparatus 50 sufficiently exhibits an effect of attenuating axial resonance.

However, the axial resonance attenuating apparatus 60 as described above requires the rubber ring 63 to entirely link the attaching member 61 and the metallic weight 62. Because of this, to adjust the resonance frequency of the axial resonance attenuating apparatus 60, there is only one method which demands changing the inner and the outer diameters and/or the hardness of the rubber ring 63, that is a method which demands changing the inner and the outer diameters and/or the material of the rubber ring 63. Thus, it is impossible to accurately match the resonance frequency of the axial resonance attenuating apparatus 60 to the resonance frequency of the rotation drum apparatus 50.

Further, since the axial resonance attenuating apparatus 60 is formed by fixing the rubber ring 63, the metallic weight 62 and the attaching member 61 to each other by an adhesive agent, the number of the parts and assembling steps is large, which increases manufacturing cost. Still further, since it is possible that the rubber ring 63 will get stripped off from the metallic weight 62 or the attaching member 61 after being adhered, or that the hardness of the rubber of the rubber ring 63 will be changed because of the adhesive agent, the reliability of the product can not be promised.

SUMMARY OF THE INVENTION

A first aspect of the present invention is directed to an axial resonance attenuating apparatus for use within a rotation drum apparatus of a magnetic recording and reproducing apparatus of a helical scanning system, to suppress axial resonance which is generated within the rotation drum apparatus when a rotation shaft rotates, the axial resonance attenuating apparatus comprising: a free rotation drum which includes a head for recording and reproducing a signal on a tape within the magnetic recording and reproducing apparatus; a rotation shaft which includes one end to which the drum is fixed; and a rotor of a motor for rotating the drum, the rotor being connected to the other end of the rotation shaft. The axial resonance attenuating apparatus is characterized in comprising an attaching member which is fixed to the rotor or the rotation shaft, a weight which is disposed with a gap from the attaching member, and a linking member having a flexibility which is formed by partially linking the attaching member and the weight.

According to a second aspect of the present invention, in the axial resonance attenuating apparatus for use within a rotation drum apparatus according to the first aspect, preferably, the linking member is formed by support rods which extend straight between the attaching member and the weight.

Alternatively, according to a third aspect of the present invention, the linking member is formed by support rods which extend in a warped shape between the attaching member and the weight.

According to a fourth aspect of the present invention, in the axial resonance attenuating apparatus for use within a rotation drum apparatus according to the first, the second or the third aspect, preferably, the attaching member, the weight and the linking member are formed by rubber or a thermoplastic resin.

According to a fifth aspect of the present invention, in the axial resonance attenuating apparatus for use within a rotation drum apparatus according to the first, the second, the third or the fourth aspect, preferably, the attaching member, the weight and the linking member are formed as one unit.

According to a sixth aspect of the present invention, in the axial resonance attenuating apparatus for use within a rotation drum apparatus according to the first, the second, the third, the fourth or the fifth aspect, preferably, the weight is formed by a material which has a larger specific gravity than the attaching member and the linking member.

According to a seventh aspect of the present invention, in the axial resonance attenuating apparatus for use within a rotation drum apparatus according to the sixth aspect, preferably, the attaching member is formed by a material which has a larger creep strength than the weight and the linking member.

In the axial resonance attenuating apparatus for use within a rotation drum apparatus according to the first aspect, since the resonance frequency of the axial resonance attenuating apparatus is freely changed by changing the configuration, the number and the material of the linking member, the resonance frequency of the rotation drum apparatus is accurately matched to the resonance frequency of the axial resonance attenuating apparatus, which in turn allows the axial resonance attenuating apparatus to exhibit an effect of attenuating axial resonance to a maximum extent.

In the axial resonance attenuating apparatus for use within a rotation drum apparatus according to the second aspect, since the linking member is formed by the straight support rods, the linking member is flexible as rubber even when the linking member is formed by a rigid material. This expands the range of selecting the material.

In the axial resonance attenuating apparatus for use within a rotation drum apparatus according to the third aspect, since the linking member is formed by the warped support rods, the support rods may be sufficiently long even when the distance between the attaching member and the weight is short. This makes it unnecessary to increase the outer diameter of the linking member to adjust the resonance frequency optimal. Hence, the size of the apparatus as a whole is reduced.

In the axial resonance attenuating apparatus for use within a rotation drum apparatus according to the fourth aspect, since the attaching member, the weight and the linking member are formed by rubber or a thermoplastic resin, the respective members are easily formed, which improves a manufacturing efficiency.

In the axial resonance attenuating apparatus for use within a rotation drum apparatus according to the fifth aspect, since the attaching member, the weight and the linking member are formed as one unit, the number of the parts and assembling steps is small, which suppresses a manufacturing cost.

In the axial resonance attenuating apparatus for use within a rotation drum apparatus according to the sixth aspect, since the weight is formed by a material which has a larger specific gravity than the attaching member and the linking member, the weight is small and hence the apparatus as a whole is small.

In the axial resonance attenuating apparatus for use within a rotation drum apparatus according to the seventh aspect, since the attaching member is formed by a material which has a larger creep strength than the weight and the linking member, the attaching member is less likely to become distorted than the other members, so that the attaching member is more reliably fixed with mass objects or the rotation shaft.

Accordingly, an object of the present invention is to provide for a reliable axial resonance attenuating apparatus for use within a rotation drum apparatus, which can be accurately matched to the resonance frequency of the rotation drum apparatus and which is easily manufactured in a short time using cheap materials.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
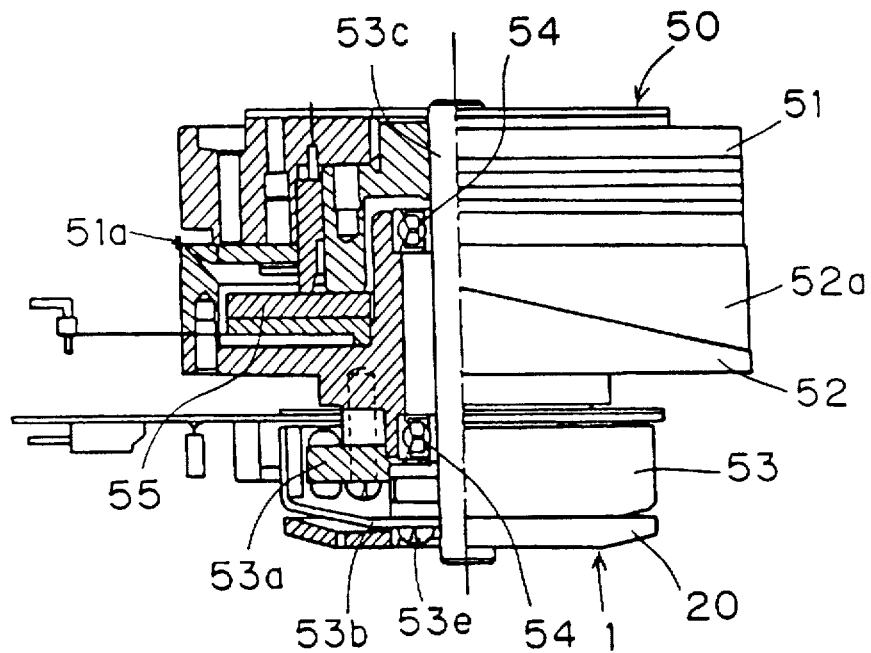
FIGS. 1A and 1B are views of an axial resonance attenuating apparatus according to a first preferred embodiment of the present invention, as it is attached to a rotation drum apparatus of a magnetic recording apparatus.

In the following, preferred embodiments will be described with reference to the drawings. Since an axial resonance attenuating apparatus of a rotation drum apparatus described here is used as it is attached to the rotation drum apparatus of the magnetic recording and reproducing apparatus described in Description of Background Art, rather than describing the rotation drum apparatus, the same reference symbols are assigned in the drawings and a redundant description will be omitted.

Figure 1B:
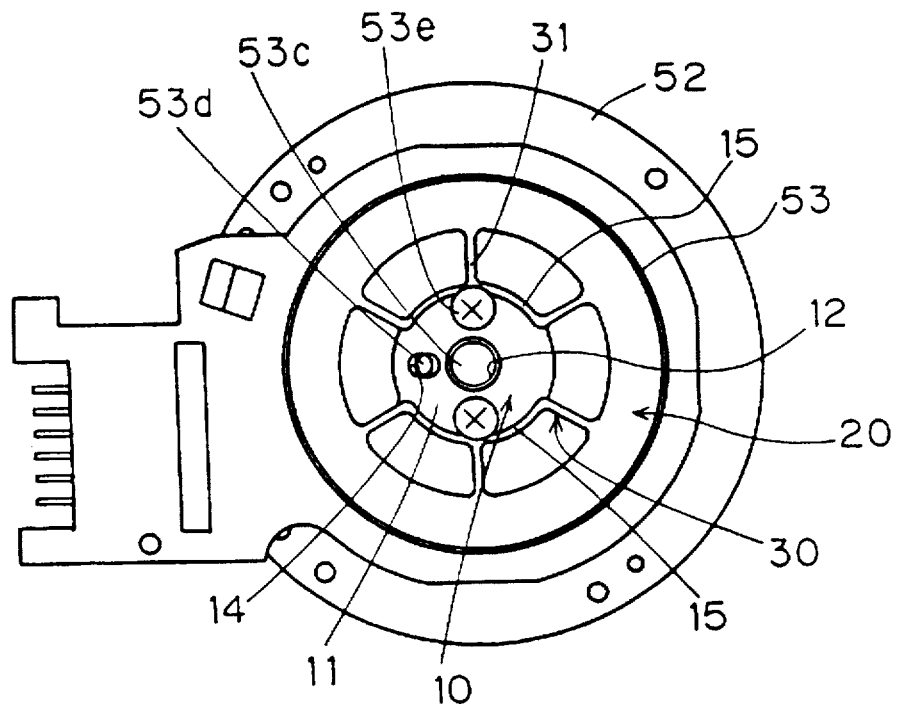
Figure 2A:
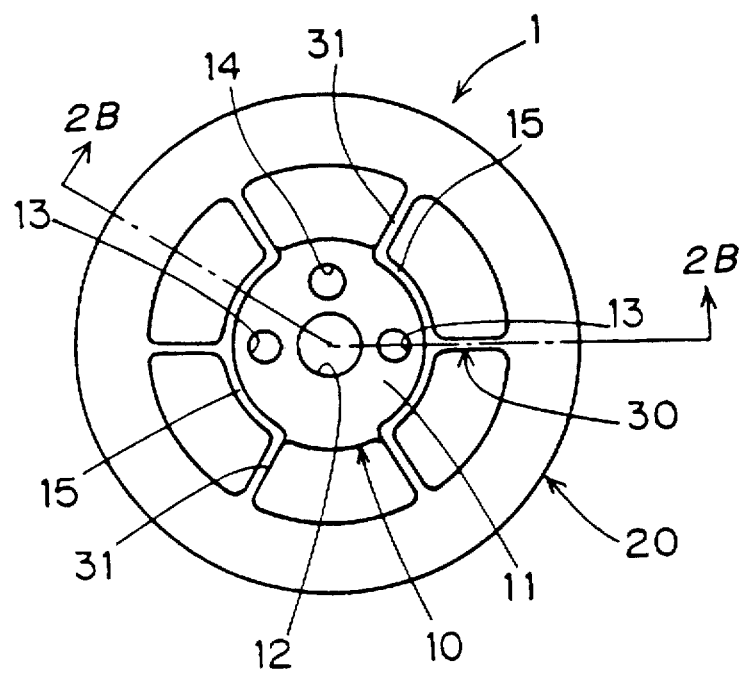
FIGS. 2A and 2B are views showing the details of the first preferred embodiment.

FIGS. 1A and 1B are a partially notched side view and a bottom view, respectively, of an axial resonance attenuating apparatus 1 as it is attached to the rotation drum apparatus 50. FIG. 2A is a bottom view of the axial resonance attenuating apparatus 1 and FIG. 2B is a cross sectional view taken along lines 2B—2B of FIG. 2A.

Figure 2B:
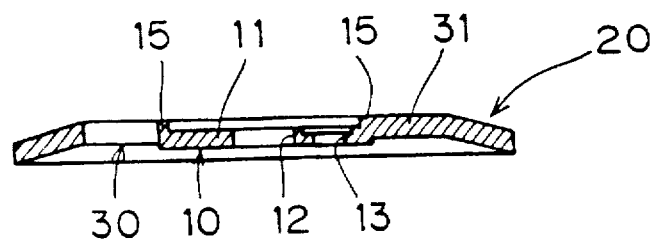

As shown in FIGS. 2A and 2B, the axial resonance attenuating apparatus 1 is formed by a disk-shaped attaching member 10, a ring-shaped weight 20 which is disposed outside the attaching member 10 to surround the attaching member 10, and a linking member 30 which partially links the weight 20 and the attaching member 10. The respective members are formed as one unit, by an acrylonitrile-butadiene-styrene copolymer (hereinafter "ABS resin").

The attaching member 10 comprises a disk-shaped attaching substrate 11 which is to be attached to the rotor 53b of the drum motor 53 of the rotation drum apparatus 50. At the center of the attaching substrate 11, a hole 12 is formed which is penetrated by a lower end portion of the drive shaft 53c of the drum motor 53.

The attaching substrate 11 also includes two screw holes 13 which are formed around the hole 12, and a positioning hole 14 for receiving and positioning a projection 53d of the rotor 53b. In a peripheral portion of the attaching substrate 11, a rib 15 is formed which projects downward for the purpose of strengthening.

The weight 20 is a ring-shaped plate member which is inclined upward from an inner side to an outer side. There is a certain gap created between the inner periphery of the weight 20 and the outer periphery of the attaching substrate 11.

The linking member 30 is formed by six straight support rods 31 which extend radially from the outer periphery of the attaching substrate 11 toward the inner periphery of the weight 20, at equal intervals of 60 degrees. The linking member 30 has a predetermined flexibility.

As shown in FIGS. 1A and 1B, the drive shaft 53c of the drum motor 53 is passed through the hole 12 of the attaching substrate 11, and a fixing screw 53e of the drum motor 53 is passed through the screw holes 13 and screwed to the rotor 53b while engaging the projection 53d of the rotor 53b with the positioning hole 14, whereby the axial resonance attenuating apparatus 1 having such a structure as described above is attached to the rotation drum apparatus 50.

An important point in designing the axial resonance attenuating apparatus 1 is setting of the shape, the number and the material of the linking member 30 which corresponds to the rubber ring 63 of the afore-mentioned conventional axial resonance attenuating apparatus 60, and setting of the mass of the weight 20 which corresponds to the metallic weight 62 of the axial resonance attenuating apparatus 60. That is, it is possible to accurately match the resonance frequency of the axial resonance attenuating apparatus 1 to that of a rotation member to which the axial resonance attenuating apparatus 1 (i.e., the rotation drum apparatus 50 in this embodiment) is attached by appropriately setting the shape, the number and the material of the linking member 30, and it is also possible to adjust the quantity of axial resonance attenuation of the axial resonance attenuating apparatus 1 by adjusting the mass of the weight 20.

Figure 3:
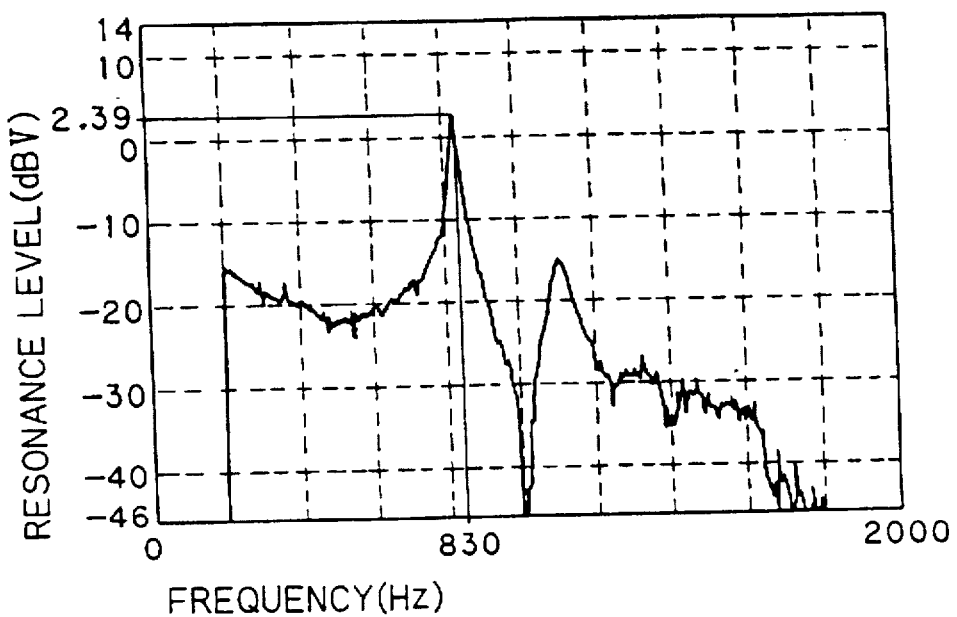
FIGS. 3 to 5 are graphs of actually measured data on a resonance frequency of the apparatus according to the first preferred embodiment as it is attached to the rotation drum apparatus of the magnetic recording apparatus.
Figure 11:
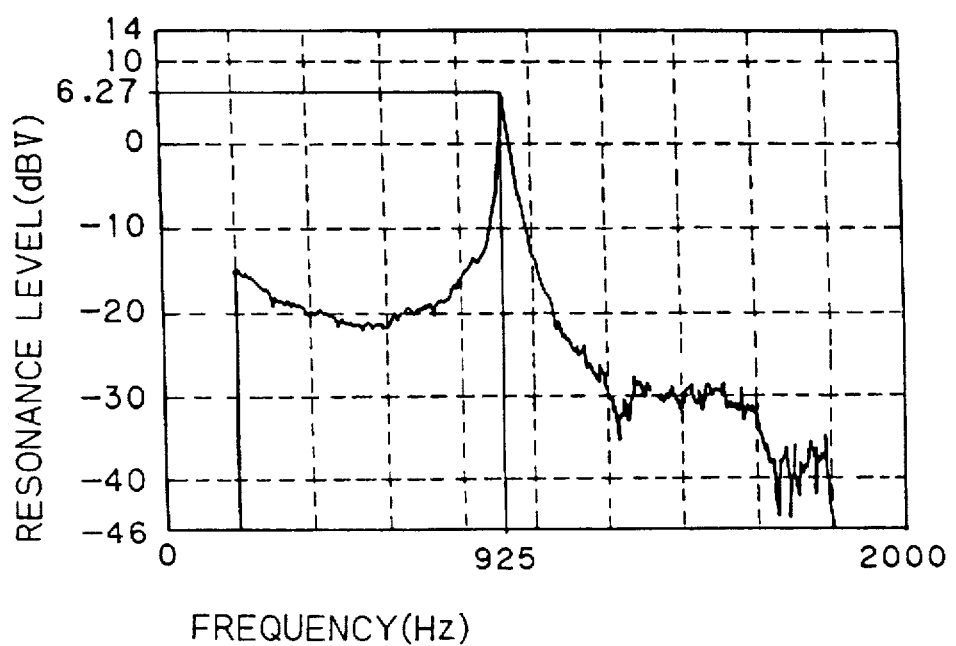
FIG. 11 is a graph of actually measured data on a resonance frequency of the rotation drum apparatus of FIG. 10A.
Figure 12A:
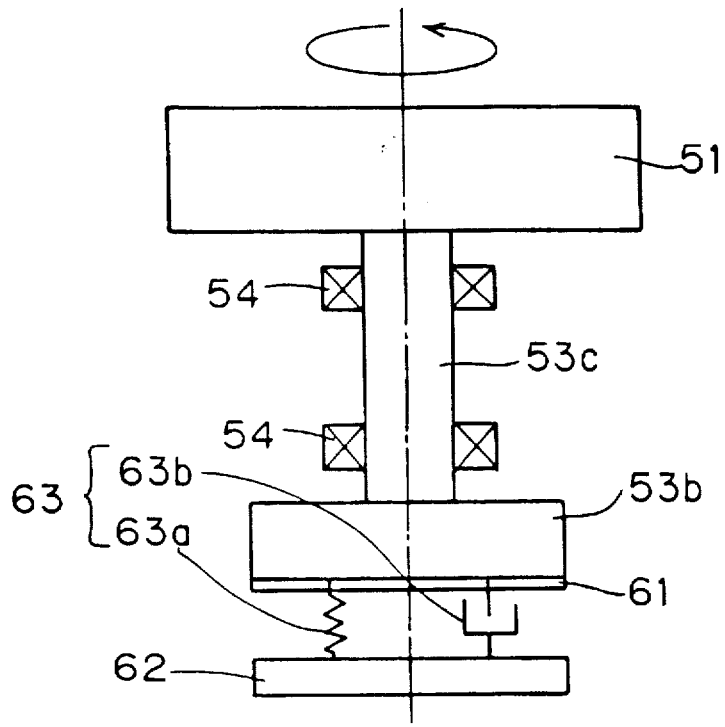
FIG. 12A is a model view showing a conventional axial resonance attenuating apparatus as it is attached to a rotation drum apparatus of a magnetic recording apparatus.
Figure 12B:
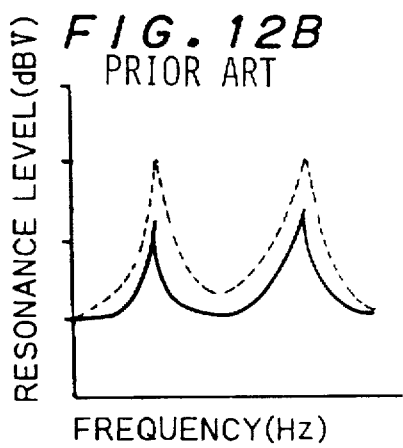
FIGS. 12B and 12C are graphs showing a general tendency of a resonance frequency of the rotation member of FIG. 12A.
Figure 12C:
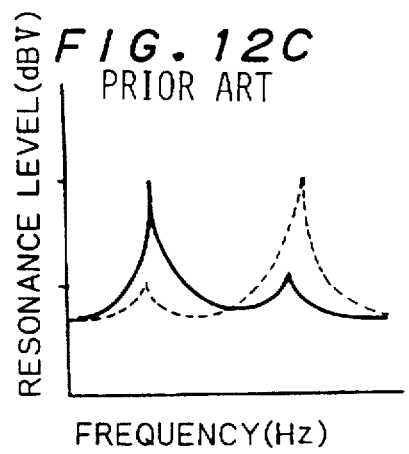
Figure 13:
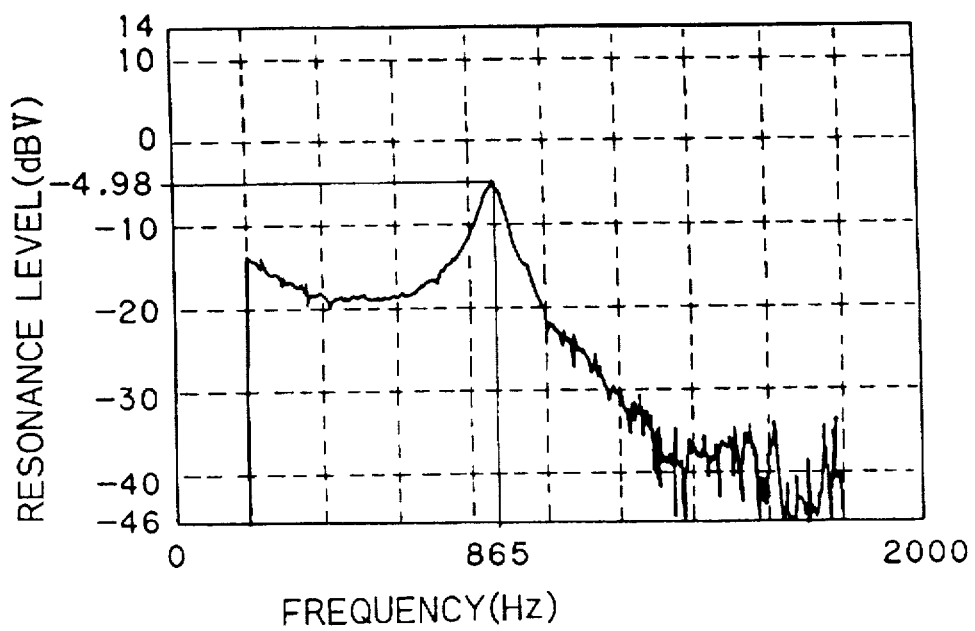
FIG. 13 is a graph of actually measured data on a resonance frequency obtained where the conventional axial resonance attenuating apparatus is attached to a rotation drum apparatus of a magnetic recording apparatus.

FIG. 3 shows actually measured data on a resonance frequency of the rotation drum apparatus 50 to which the axial resonance attenuating apparatus 1 as it is optimally adjusted is attached. It is understood that there is an effect of attenuating axial resonance by 11.98 dBV, as compared with the actually measured data on the resonance frequency of the rotation drum apparatus 50 without the axial resonance attenuating apparatus 1 attached thereto (See FIG. 11).

Figure 4:
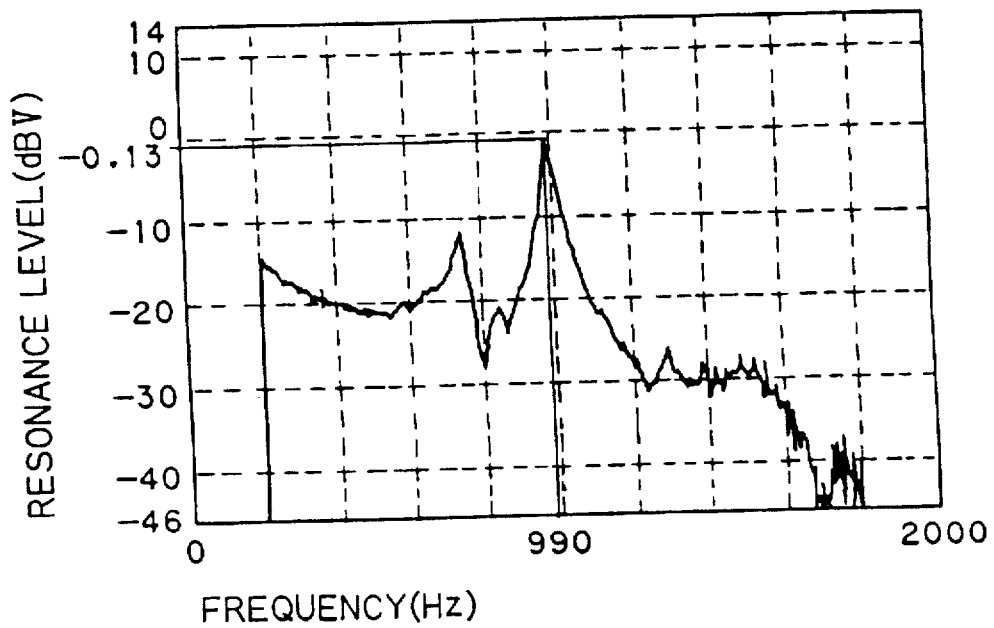
Figure 5:
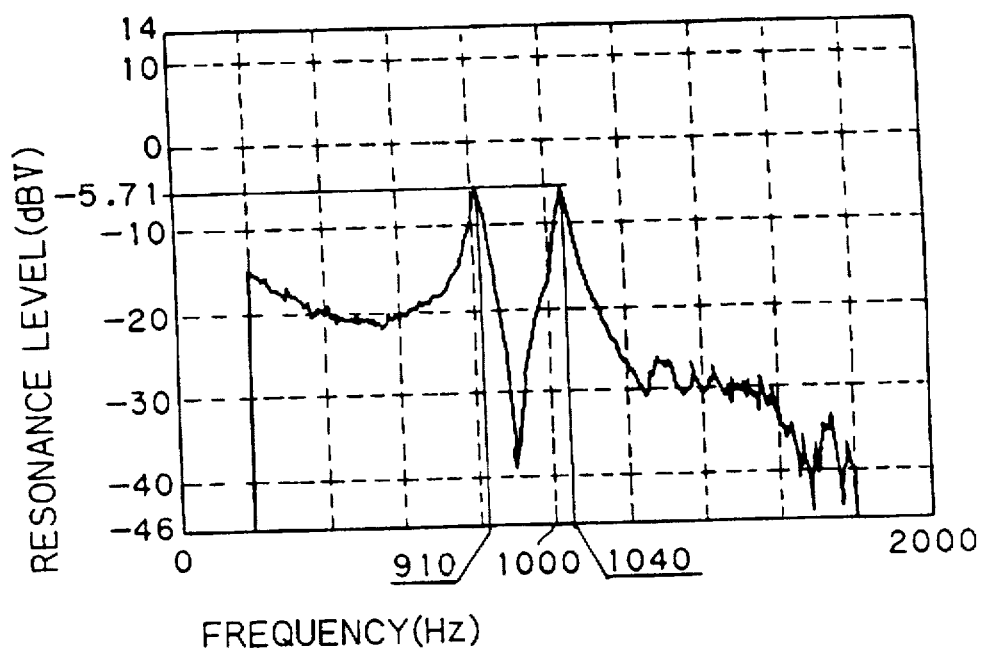

However, when the resonance frequency of the axial resonance attenuating apparatus 1 is shifted from the resonance frequency of the rotation drum apparatus 50, as shown in FIGS. 4 and 5, there is imbalance created between two peak levels, that is, one of the peak levels becomes larger. Although this reduces the axial resonance attenuating effect at a resonance point of the rotation drum apparatus 50 to which the axial resonance attenuating apparatus 1 is not attached, as described above, such a condition can be corrected to the condition which is shown in FIG. 3, by adjusting the shape, the number and the material of the linking member 30. Fine adjustment is possible since there are more adjustment parameters than in the case where only the inner and the outer diameters and/or the material (hardness) of the rubber ring 63 are changed as in the conventional example.

In addition, since the attaching member 10 and the weight 20 are partially linked by the linking member 30 in the axial resonance attenuating apparatus 1, even when the linking member is made of a rigid material such as an ABS resin which has a smaller attenuating effect than rubber, the linking member has a flexibility which is similar to that of rubber, which in turn advantageously expands the range of selecting the material.

Further, since the respective members forming the axial resonance attenuating apparatus 1 are manufactured as one unit by an ABS resin, unlike in the conventional axial resonance attenuating apparatus 60, it is not necessary to use an adhesive agent during assembling of the respective members, so that no deterioration in the quality will be created which is attributed to a change in the hardness of the rubber ring 63 associated with hardening of the adhesive agent, post-adhering stripping off of the rubber ring 63, etc. This also reduced the number of the parts and assembling steps, resulting in an advantage in terms of a manufacturing cost.

Figure 6A:
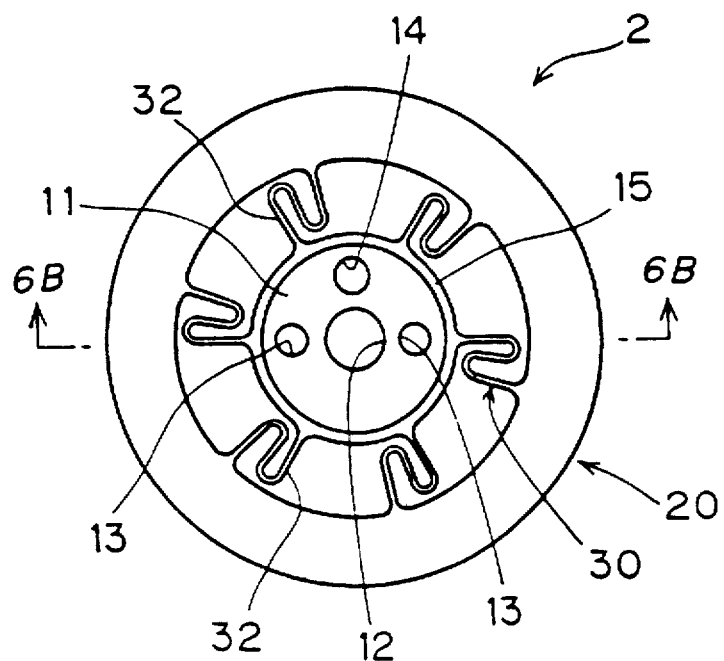
FIGS. 6A and 6B are views showing the details of a second preferred embodiment of the present invention.
Figure 6B:
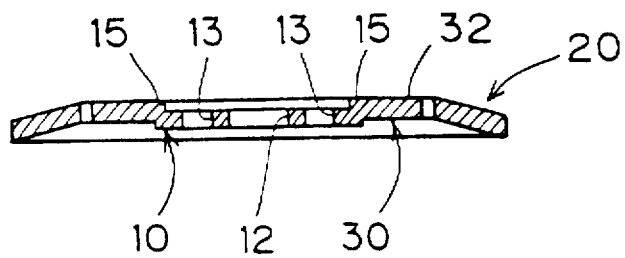
Figure 7A:
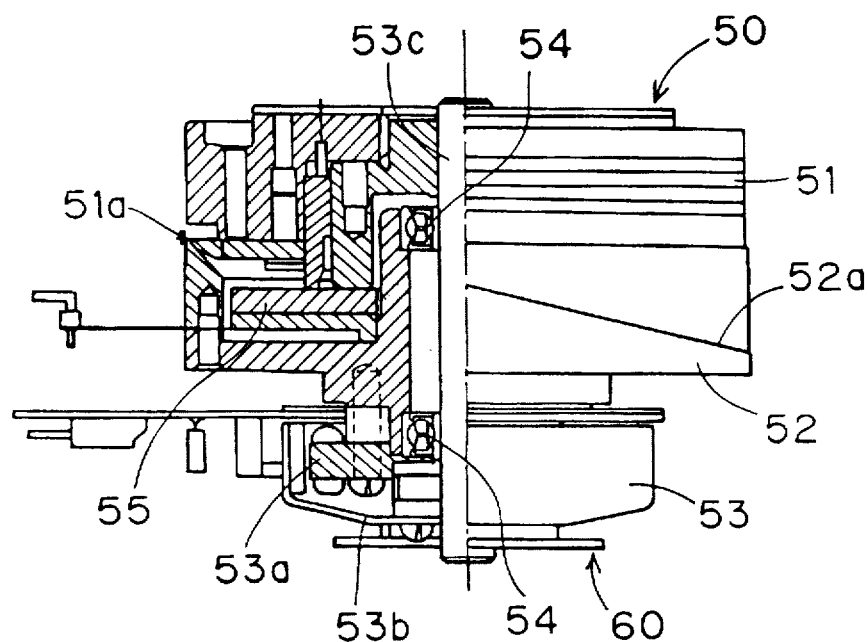
FIGS. 7A and 7B are views showing a conventional axial resonance attenuating apparatus as it is attached to a rotation drum apparatus of a magnetic recording apparatus.
Figure 7B:
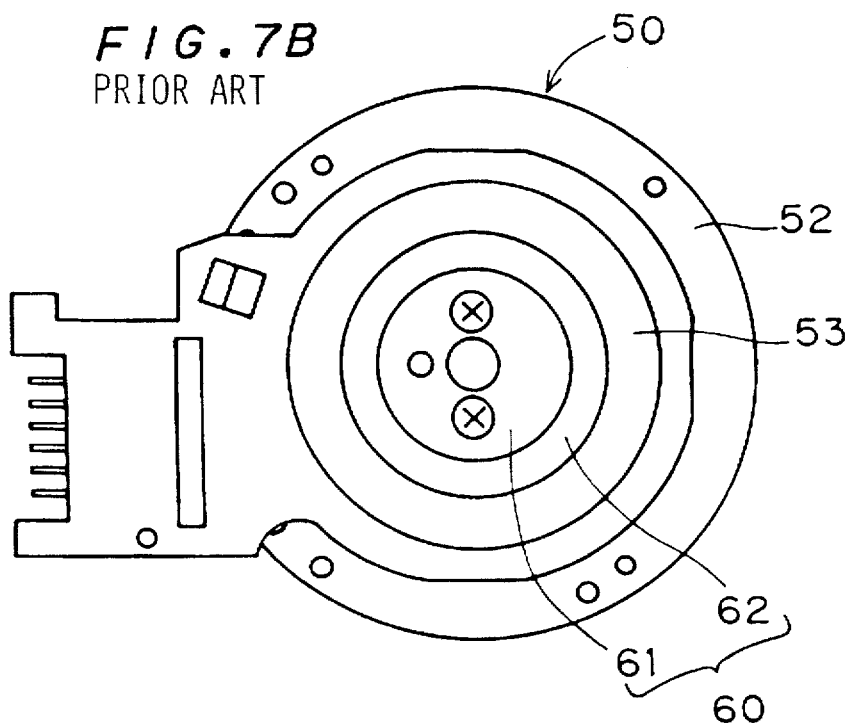
Figure 8A:
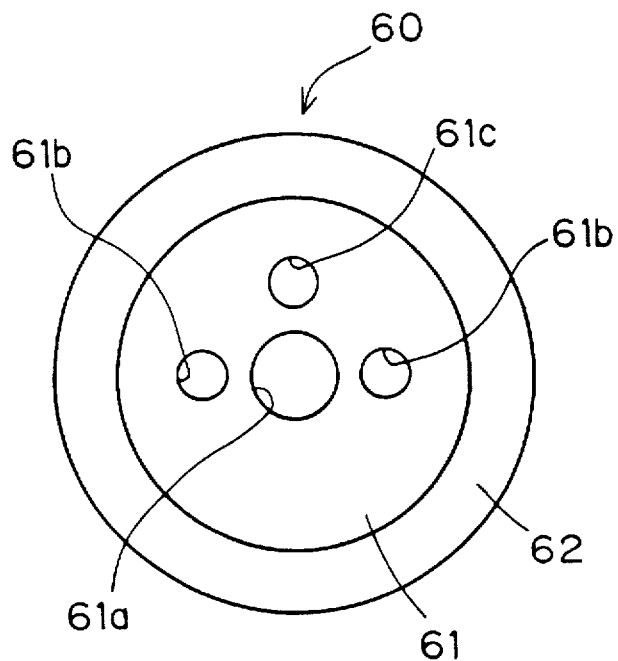
FIGS. 8A and 8B are views showing the details of the conventional axial resonance attenuating apparatus.
Figure 8B:
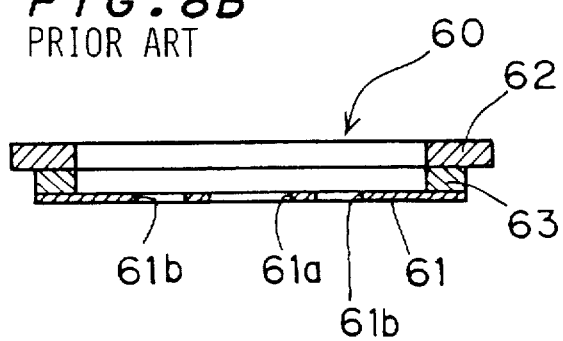
Figure 9:
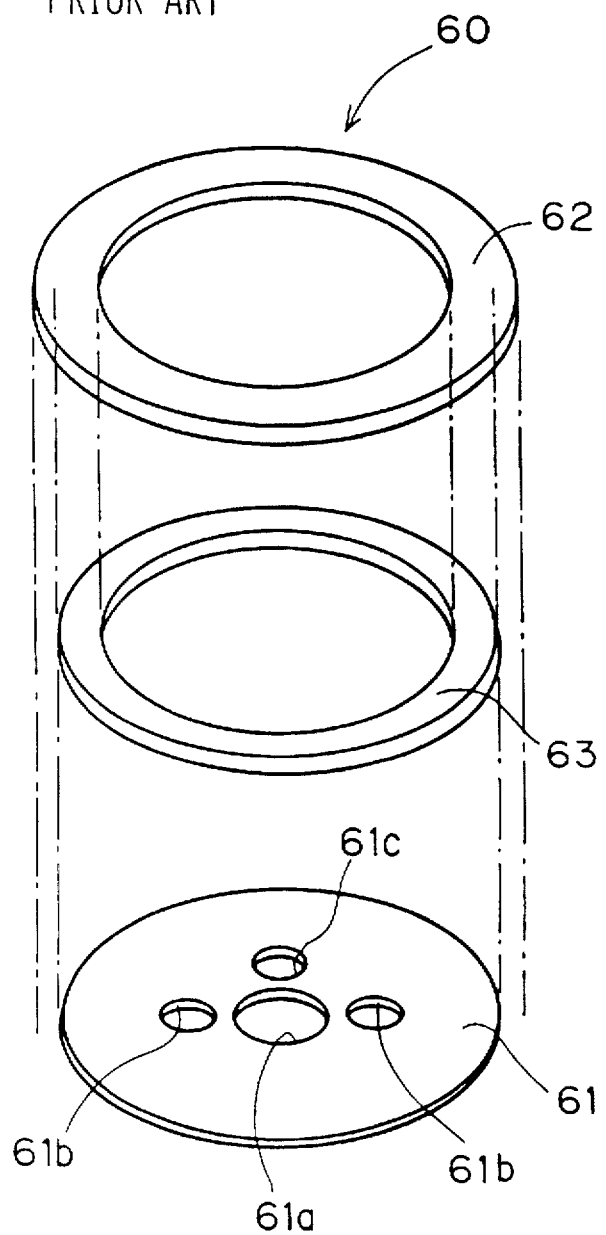
FIG. 9 is a perspective view of the conventional axial resonance attenuating apparatus as it is disassembled.
Figure 10A:
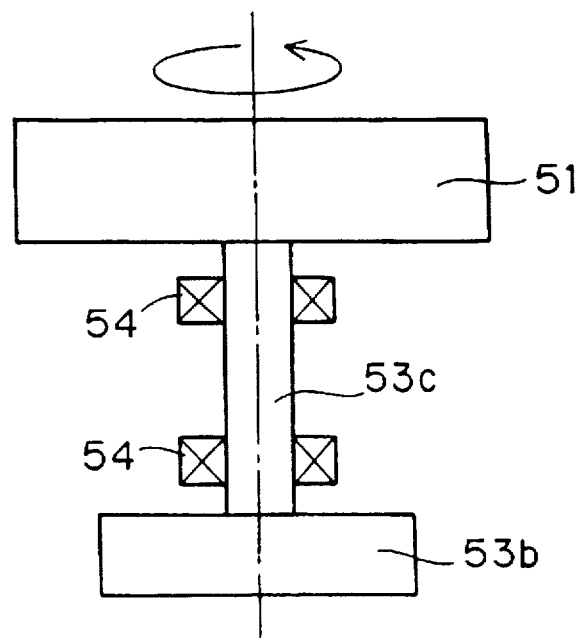
FIG. 10A is a model view showing a rotation drum apparatus of a magnetic recording apparatus, as a rotation member.
Figure 10B:
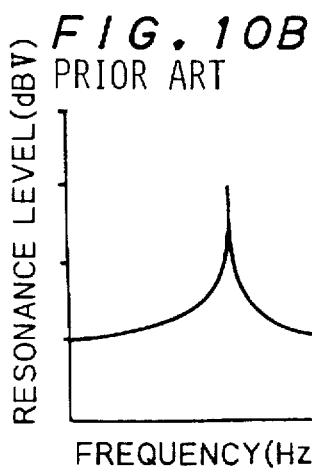
FIG. 10B is a graph showing a general tendency of a resonance frequency of the rotation member of FIG. 10A.

FIG. 6A is a bottom view showing the structure of an axial resonance attenuating apparatus 2 of a second embodiment and FIG. 6B is a cross sectional view taken along lines 6B—6B of FIG. 6A. The axial resonance attenuating apparatus 2 is approximately the same as that of the first preferred embodiment. Therefore, the same reference symbols are assigned to the same elements and a description of such elements will be omitted. Rather, only elements having different structures will be described.

A difference between the axial resonance attenuating apparatus 2 and the axial resonance attenuating apparatus 1 lies in the linking member 30. In short, while the axial resonance attenuating apparatus 1 requires that the linking member 30 is formed by the straight support rods 31, the axial resonance attenuating apparatus 2 requires that support rods 32 are warped in the shape of the letter "S."

When the support rods 32 are warped in the shape of the letter "S," the length of the linking member 30 is increased without increasing the gap between the attaching member 10 and the weight 20 to be larger than in the straight support rods 31. Hence, it is possible to prevent the apparatus as a whole from becoming large, even when the apparatus requires a long linking portion to adjust the resonance frequency to an optimal value.

The configuration of the support rods 32 may not be S-shaped. Rather, the support rods 32 may be warped appropriately so as to match to the resonance frequency of the rotation member.

Although the two preferred embodiments described above both require the respective members to be formed as one unit by an ABS resin, an ABS resin may not be used. Rather, in a third embodiment other thermoplastic resin or rubber may be used.

The three preferred embodiments described above all require the respective members to be formed as one unit by the same material such as a resin or rubber. Instead, in a fourth embodiment metallic powder or the like having a large mass may be mixed with a resin or rubber to form the weight 20, i.e., the weight 20 may be formed by a material which has a larger specific gravity than the material of the attaching member 10 and the linking member 30, to thereby form the respective members as one unit. When such a structure is adopted, it is not necessary to form the weight 20 larger than needed to ensure a large axial resonance attenuating effect, which in turn prevents the apparatus as a whole from being a large apparatus.

In the fourth preferred embodiment, of the respective members which are formed as one unit, the weight 20 is formed by a resin or rubber of a material which is different from the attaching member 10 and the linking member 30. Further, in a fifth embodiment the attaching member 10 as well may be formed by a resin or rubber which has an increased creep strength by mixing metallic powder, glass powder, etc., or by a resin which has a large creep strength such as polyphenylene sulfide, in forming the respective members as one unit. When such a structure is adopted, the attaching member 10 is less likely to become distorted than the other members and fixed contact with the rotation member does not deteriorate, so that the reliability of the product itself is improved.

While the preferred embodiments above require the axial resonance attenuating apparatus to be attached to the rotor 53b of the drum motor 53 of the rotation drum apparatus 50, it is not always necessary to attach the axial resonance attenuating apparatus to one of the mass objects of the rotation member which are fixed to the both ends of the rotation shaft. Rather, in a sixth embodiment the axial resonance attenuating apparatus may be attached directly to the rotation shaft, depending on the rotation drum apparatus.

While the invention has been described in detail, the foregoing description is in all aspects illustrative and not restrictive. It is understood that numerous other modifications and variations can be devised without departing from the scope of the invention.

We claim:

1. A rotation drum apparatus for a magnetic recording and reproducing apparatus of a helical scanning system comprising:

a rotation drum including a head for recording and reproducing a signal on a tape within the magnetic recording and reproducing apparatus;

a rotary shaft including one end to which said rotation drum is fixed;

a rotor of a motor for rotating said rotation drum, said rotor being connected to a second end of said rotary shaft opposite said one end; and axial resonance attenuating means for suppressing axial resonance generated within the rotation drum apparatus when said rotary shaft rotates, said axial resonance attenuating means comprising an attaching member fixed to said rotor or said rotary shaft, a weight disposed away from said attaching member, a gap being formed between said attaching member and said weight, and one or more flexible webs linking said attaching member and said weight such that said axial resonance attenuating means has a resonance frequency which matches a main resonance frequency of the remainder of the rotation drum apparatus.

said attaching member, said weight and said one or more flexible webs being formed as one substantially coplanar unit in a radial direction, said weight having a larger specific gravity than said attaching member and said one or more flexible webs, and said attaching member having a larger creep strength than said weight and said one or more flexible webs.

2. The rotation drum apparatus of claim 1, wherein said one or more flexible webs are support rods which extend linearly between said attaching member and said weight.

3. The rotation drum apparatus of claim 1, wherein said one or more flexible webs are support rods which extend in a warped shape between said attaching member and said weight.

4. The rotation drum apparatus of claim 1, wherein said attaching member, said weight and said one or more flexible webs are formed by rubber or a thermoplastic resin.

* * * * *